F. F. FURR.
TRUCK.
APPLICATION FILED DEC. 23, 1914.
1,203,107.
Patented Oct. 31, 1916.
2 SHEETS—SHEET 1.
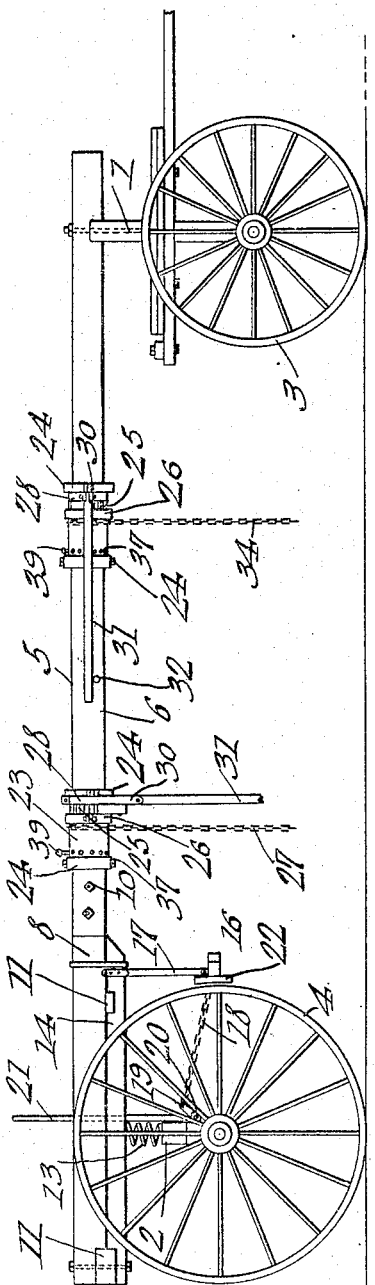
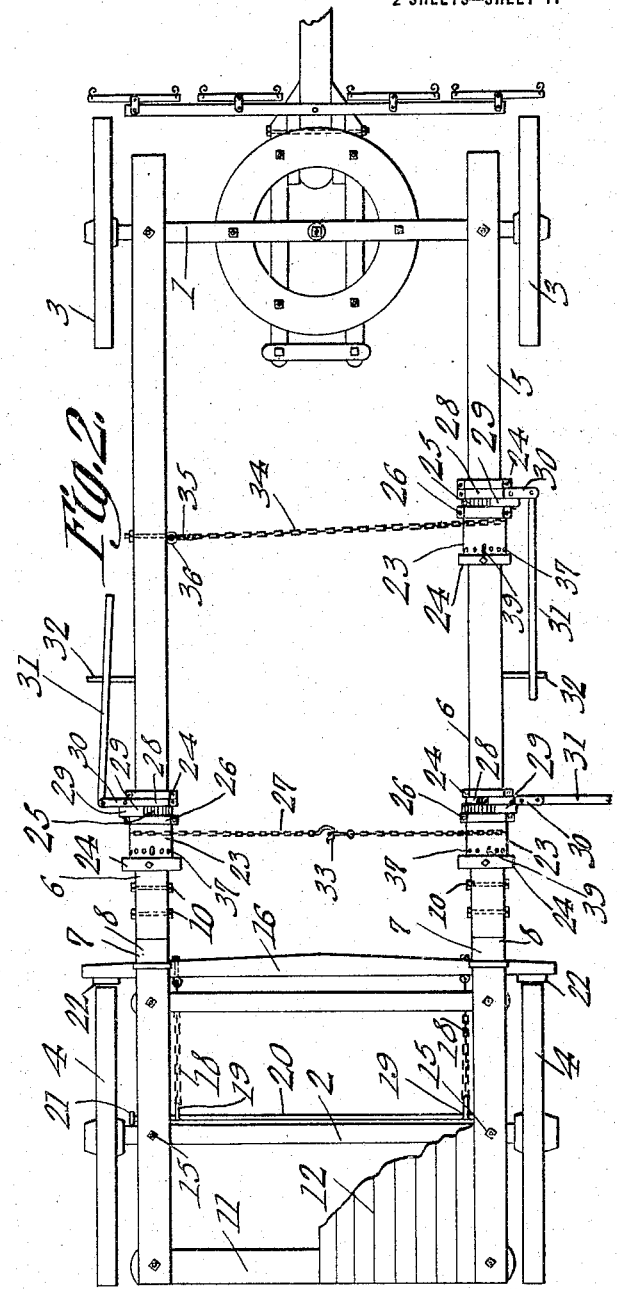
Witnesses
F. F. Furr
Inventor
by
Attorneys F. F. FURR.
TRUCK.
APPLICATION FILED DEC. 23, 1914.
1,203,107.
Patented Oct. 31, 1916.
2 SHEETS—SHEET 2.
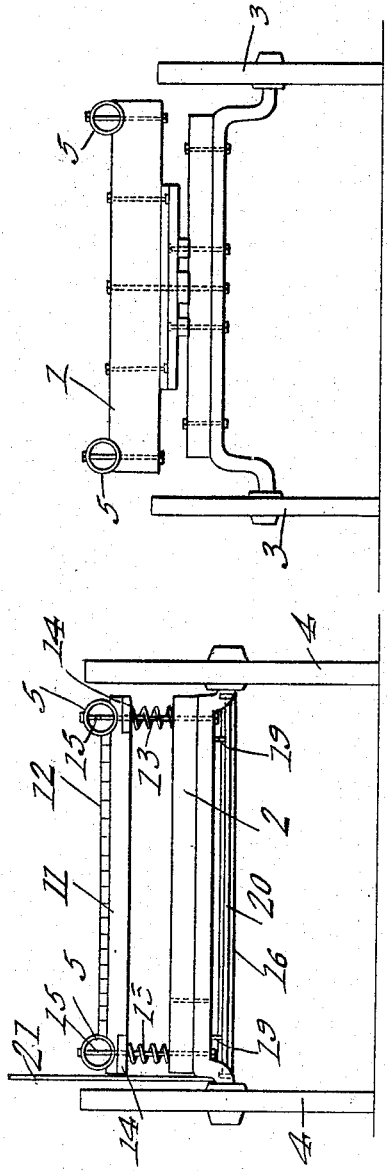
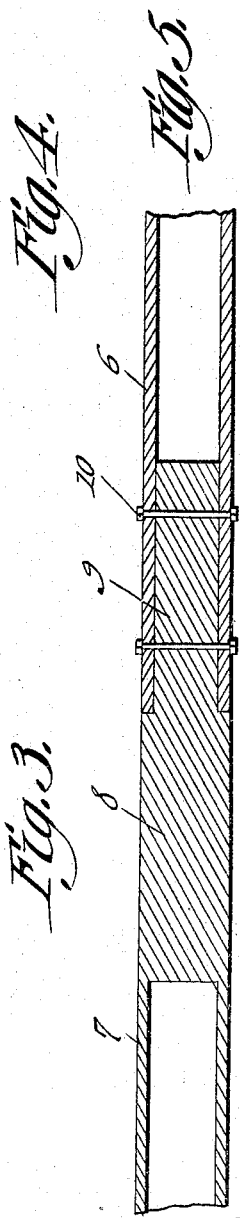
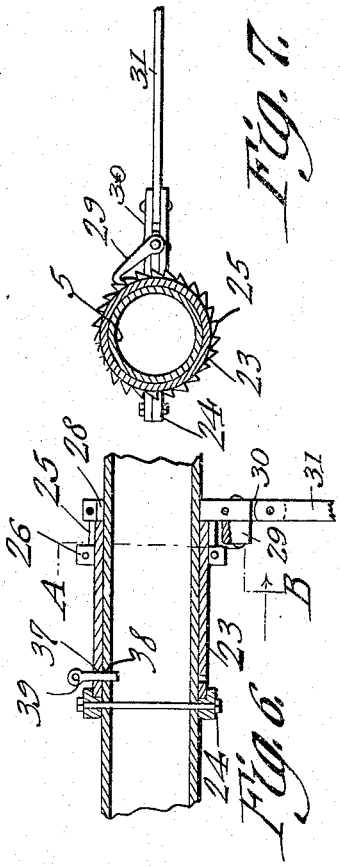
Witnesses
Inventor
F. F. Furr
by
Attorneys ic
UNITED STATES PATENT OFFICE.

FARRELL F. FURR, OF WEST UNION, WEST VIRGINIA.

TRUCK.

1,203,107.	Specification of Letters Patent.	Patented Oct. 31, 1916.

Application filed December 23, 1914. Serial No. 878,786.

*To all whom it may concern:*

Be it known that I, FARRELL F. FURR, a citizen of the United States, residing at West Union, in the county of Doddridge and State of West Virginia, have invented a new and useful Truck, of which the following is a specification.

This invention relates to trucks especially designed for use in hauling boilers, tanks, and like articles of a heavy bulky nature, the truck being especially useful in oil regions where it is necessary to handle bulky objects of the type mentioned.

One of the objects of the invention is to provide a truck of this type designed to be brought to position astride the boiler or other object to be conveyed, after which said object can be elevated by means carried by the truck so as to hang suspended under the truck whereby the object can be transported readily from place to place, it being possible to deposit the object on the ground wherever desired and then withdraw the truck from position above it.

A further object is to provide a truck of this character which is simple and durable in construction and which is capable of making short turns.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of the truck. Fig. 2 is a plan view thereof, a portion of the platform being removed. Fig. 3 is a rear elevation of the truck. Fig. 4 is a front elevation thereof, the draft devices being removed. Fig. 5 is an enlarged longitudinal section through a portion of one side of the frame of the truck and showing how the sections of the frame are connected. Fig. 6 is an enlarged longitudinal section through a portion of one side of the frame and the winding drum thereof. Fig. 7 is a section on line A—B Fig. 6.

Referring to the figures by characters of reference 1 and 2 designate front and rear bolsters respectively supported by the front and rear wheels 3 and 4, these bolsters 1 and 2 constituting connections between the front and rear ends respectively of the side members 5 of the truck frame. Each of the side members 5 is preferably formed of heavy tubing and, in the present instance, each of these side members is made up of two sections 6 and 7 respectively, the section 7 being provided with a solid end portion 8 from which extends a cylindrical tongue 9 which fits snugly within one end of the section 6 and is fastened therein in any desired manner, as by means of transverse bolts 10. By making the side members of sections, it will be seen that the truck can be adjusted to any length desired by interposing sections between the sections 6 and 7. Cross bars 11 are secured to the sides adjacent the rear ends thereof and constitute supports for a platform 12.

It will be seen that the front supporting wheels 3 are of such size as to move under the front portion of the truck frame when the vehicle is turned, thereby making it possible to turn the vehicle in a relatively small space.

For the purpose of yieldingly supporting the rear portion of the frame of the vehicle, springs 13 are preferably interposed between the bolster 2 and longitudinal beams 14 which are fastened under the side members 5 and to the ends of the cross bars 11. Where these springs are used as shown in Figs. 1 and 3, standards 15 are extended upwardly from the end portions of the bolster 2 and through the springs, these standards being slidably engaged by the beams 14 and the side members 5.

A brake beam 16 may be suspended transversely under the frame of the truck by links 17 and chains 18 may be extended from this beam to radial arms 19 extending from a transverse rod 20 journaled on the bolster 2. This rod is adapted to be actuated by means of a lever 21 so as to cause the arms 19 to pull through chains 18 upon the beam 16 and cause the brake shoes 22 to be applied to the wheels 4.

Mounted for rotation on each of the side members 5 of the truck frame are two drums 23 held against longitudinal movement relative to the side member by split collars 24 extending around and clamped upon the member 5 close to each end of the drum. A ratchet wheel 25 is formed integral with each drum and a collar 26 extends around each drum close to the ratchet wheel thus to prevent the ratchet wheel from being crowded by a chain 27, cable or the like adapted to be wound on the drum. A ring 28 is mounted for rotation upon the member 5 between the ratchet wheel 25 and one of the collars 24 and this ring carries a pawl 29 so located as to engage the teeth of the ratchet wheel. An arm 30 extends radially from ring 28 and is pivotally engaged by a handle 31 which, when not in use, can be swung inwardly so as to rest upon a laterally extending finger 32 projecting from the member 5.

One of the frame members 5 is provided with a pair of winding drums such as described, while the other member 5 is provided with but a single winding drum. The chains 27 connected to the two opposed winding drums are adapted to be detachably connected by hooks 33. The chain 34 extending from the other winding drum is adapted to be detachably connected to the opposed member 5 by means of a hook 35 engaging an eye secured to said member 5, said eye being indicated at 36.

It is to be understood that by making the side members 5 in sections, it becomes possible readily to slip the winding drums and their retaining collars onto the side members 5 while the sections of the side members are disconnected.

When it is desired to use the truck for the purpose of conveying a boiler or other heavy and bulkey object, the said truck is brought to position astride the object and the chains 27 are unwound from the drums 23 and extended under the object, the hooks 33 at the free ends of the chains being placed in engagement with each other. Chain 34 is unwound from its drum and extended under the object and then secured to the eye 36. With the parts thus positioned the drums are rotated by means of their ratchets and pawls so as to wind the chains and lift the boiler or other object from the ground so that it will hang suspended from the truck frame. For the purpose of holding the drum against movement after the chain has been wound thereon, any suitable means may be provided. For example, and as shown in the drawings, each drum may be formed with an annular series of apertures 37 adapted to be brought successively into register with an aperture 38 formed in one of the sections of the side member 5. A pin 39 is adapted to be inserted into the registering apertures and will thus hold the drum against rotation. With the boiler or other object thus suspended under the vehicle, it can be conveyed from place to place and, when brought to the point of delivery, the drums can be released so as to permit the chains to unwind whereupon the object will be deposited on the ground. After the chains have been released at their ends, the vehicle can be drawn from position above the deposited object.

As before pointed out a vehicle such as herein described is especially useful in oil districts where it is often necessary to haul large and heavy objects, although it is to be understood that the same can also be used readily wherever the hauling of large objects is necessary.

What is claimed is:

1. The combination with the front and rear bolsters of a truck, of cylindrical connections between the bolsters and constituting the sides of the truck frame, drums revoluble on said connections, means upon each connection for holding the drum thereon against longitudinal movement relative to the connection, coöperating means upon each drum and connection for rotating the drum in one direction, flexible elements secured at one end to the respective drums and at the other end to the opposed connecting member, and coöperating means upon the drums and connecting member for holding said drums against rotation.

2. The combination with the front and rear bolsters of a truck, of connections between the bolsters and constituting the side members of the truck frame, each connection being cylindrical and consisting of detachably connected sections, a drum extending around and adapted to rotate upon each of said connections, means for holding each drum against longitudinal movement relative to the connection on which it is mounted, flexible elements each secured at one end to one of the drums, coöperating means upon each connection and the drum thereon for rotating the drum to wind the flexible elements thereon, and coöperating means upon each connection and the drum for holding the drum against rotation.

In testimony that I claim the foregoing as my own, I have hereto affixed my signature in the presence of two witnesses.

FARRELL F. FURR.

Witnesses:
A. B. CLEVENGER,
H. L. McCANDLESS.